US00RE39673E

(19) United States
(12) Reissued Patent
Lee et al.

(10) Patent Number: US RE39,673 E
(45) Date of Reissued Patent: Jun. 5, 2007

(54) METHOD OF PROVIDING BURST TIMING FOR HIGH-SPEED DATA TRANSMISSION IN A BASE STATION TRANSCEIVER SYSTEM OF A MOBILE COMMUNICATION SYSTEM

(75) Inventors: Hyun-Seok Lee, Seoul (KR); Yong Chang, Songnam-shi (KR)

(73) Assignee: Samsung Electronics Co., Ltd. (KR)

(21) Appl. No.: 10/985,830

(22) Filed: Nov. 10, 2004

Related U.S. Patent Documents

Reissue of:
(64) Patent No.: 6,490,268
Issued: Dec. 3, 2002
Appl. No.: 09/570,844
Filed: May 12, 2000

U.S. Applications:
(62) Division of application No. 60/133,790, filed on May 12, 1999.

(51) Int. Cl.
*H04B 7/216* (2006.01)

(52) U.S. Cl. ..... 370/342; 370/310.1; 370/335; 370/348

(58) Field of Classification Search ..... 370/310.1, 370/310.2, 328, 329, 335, 342, 340, 341, 370/348, 395.65, 338, 401, 431, 437, 438, 370/439, 442, 465, 468
See application file for complete search history.

(56) References Cited

U.S. PATENT DOCUMENTS 5,884,187 A 3/1999 Ziv et al.
5,966,378 A * 10/1999 Hamalainen ..... 370/348
6,069,883 A * 5/2000 Ejzak et al. ..... 370/335
6,091,740 A * 7/2000 Karasawa ..... 370/458
6,229,793 B1 * 5/2001 Jawanda ..... 370/328
6,317,435 B1 * 11/2001 Tiedemann et al. ..... 370/441
6,724,740 B1 * 4/2004 Choi et al. ..... 370/335

FOREIGN PATENT DOCUMENTS

WO WO 99/14975 3/1999

OTHER PUBLICATIONS

"Mobile Station–Base Station Compatibility Standard for Wideband Spread Spectrum Cellular Systems", TIA/EIA Standard, Mar. 1999.

* cited by examiner

*Primary Examiner*—Chirag Shah
(74) *Attorney, Agent, or Firm*—The Farrell Law Firm

(57) ABSTRACT

A method of establishing a supplemental channel (SCH) to provide burst timing for high-speed data transmission in a mobile communication system is disclosed. In the SCH establishing method, a source base station transceiver determines that a traffic burst exists and sends a target base station transceiver a burst request message. The burst request message includes forward and reverse burst timing information and channel use time information, which is determined in consideration of a discontinuous transmission (DTX) mode, in order to reserve necessary resources, when a large amount of high rate data is to be transmitted. Then, the target base station transceiver sends the source base station transceiver a burst response message including information about resources committed to the traffic burst.

28 Claims, 4 Drawing Sheets

METHOD OF PROVIDING BURST TIMING FOR HIGH-SPEED DATA TRANSMISSION IN A BASE STATION TRANSCEIVER SYSTEM OF A MOBILE COMMUNICATION SYSTEM

Matter enclosed in heavy brackets [ ] appears in the original patent but forms no part of this reissue specification; matter printed in italics indicates the additions made by reissue.

This Application claims the benefit of 60/133,790, filed May 12, 1999.

BACKGROUND OF THE INVENTION

1. Field of the Invention

The present invention relates generally to a method of providing burst timing in a base station (BS) of a mobile communication system, and in particular, to a method of providing forward and reverse burst timing with respect to the time of using a supplemental channel (SCH) and a supplemental code channel (SCCH) for rapid transmission of a large amount of data in a BS, taking into account a discontinuous transmission (DTX) mode.

Specifically, the present invention relates to a method of providing burst timing definable with respect to the use time of a physical channel and the start and end time of data and a method of supporting an AAL5 protocol for high-speed data transmission between BTSs by a base station transceiver system (BTS) and a base station controller (BSC) in a mobile communication system under a ratio channel environment which allows high-speed data processing.

2. Description of the Related Art

Typical CDMA (Code Division Multiple Access) mobile communication systems provide mainly voice service, but the IMT-2000 (International Mobile Telecommunications-2000) standard has been developed to additionally provide high-speed data transmission. IMT-2000 mobile communication systems are capable of transmitting high quality voice and moving pictures, as well as Internet browsing.

A CDMA mobile communication system is comprised of a BS including a BTS and a BSC, a mobile switching center (MSC), and a mobile station (MS). Radio links between an MS and a BTS include a forward link directed from the BTS to the MS and a reverse link directed from the MS to the BTS.

All channels are divided into physical channels and logical channels. A logical channel .is set on a physical channel and it is possible that a plurality of logical channels are set on one physical channel. If the physical channel is released, the logical channels are automatically released. However, a physical channel is not necessarily created to set up a new logical channel. If a physical channel that can carry another logical channel has already been occupied for other logical channels, all that should be done is to assign the new logical channel to the already established physical channel.

Physical channels are categorized into dedicated channels and common channels according to their characteristics. The dedicated channels are so named because they are dedicated to communication between a BS and a particular MS, and include a fundamental channel (FCH), a dedicated control channel (DCCH), and a SCH. The FCH, compatibly used with TIA/EIA-95-B, transmits voice, data, and signaling signals. The common channels indicate channels, commonly shared by a BS and a plurality of MSs. A forward physical channel transmitted to the MSs from the BS is a paging channel, and a reverse channel transmitted to the BS from an MS is an access channel. These common channels are compatible with IS-95-B.

Data communication in a mobile communication system is characterized by bursts of concentrated data transmission interspersed between long periods of no data transmission. Accordingly, the next generation mobile communication system is developed in such a way that it can operate in a discontinuous transmission (DTX) mode in which a dedicated channel is only assigned when there is data to be transmitted.

In the DTX mode, frame data is transmitted only when transmission data exists in a wired communication system or in a mobile communication system. Hence, if transmission data is absent for a predetermined time period in the DTX mode, frame data is not transmitted. The DTX mode has the distinctive advantages of minimum transmission power, reduction of the strength of interference which adversely affects the system, and increase of total system capacity.

The DTX mode is supported on a DCCH and an SCH. Because of this, the DCCH can be used as a control channel which provides an efficient packet service. In DTX mode, null frames are transmitted on the DCCH for power control and no data is transmitted on the SCH. Considering limited radio resources, BS capacity, and power consumption of an MS, dedicated traffic and control channels are connected only during actual data transmission and released during non-transmission periods while in the DTX mode. Communication is conducted on a common channel while the dedicated channels are released. As a result, the usage efficiency of the radio resources is increased. Various channel states are set according to channel assignment and the presence or absence of state information in order to implement the DTX mode.

FIG. 1 is a state transition diagram for a typical packet service in a mobile communication system.

Referring to FIG. 1, a packet service is comprised of an active state 11, a control hold state 12, a suspended state 13, a dormant state 14, a packet null state 15, and an initialization state 10. Service options are connected in the control hold state 12, the active state 11, and the suspended state 13. It is to be noted herein that the present invention pertains to a base station which supports the DTX mode on an SCH and a DCCH in the active state 11 and the control hold state 12.

FIG. 2 illustrates a reference model of 3G IOS (Interoperability Specifications) for a digital air interface between an MSC and a BS and between BSs in a general mobile communication system.

Referring to FIG. 2, an A1 interface and an A2/A5 (exclusive for circuit data) interface are defined for transmitting a signal and transmitting user information, respectively, between an MSC 20 and a BSC 32. An A3 interface is defined to connect a target BS 40 to a frame selection/distribution function unit (SDU) 34 of a source BS 30 for soft/softer handoff between BSs. Using the A3 interface, signaling and user data are transmitted between the target BS 40 and the SDU 34 of the source BS 30. An A7 interface is defined to transmit/receive signals between the target BS 40 and the source BS 30 for soft/softer handoff between BSs. Wired communications links between the BSs 30 and 40 and between the BS 30 and the MSC 20 are a forward link directed from the MSC 20 to the BS 30, a reverse link directed from the BS 30 to the MSC 20, and a link connected between the BSs 30 and 40. The MSC 20 has a call control & mobility management block 22 and a switch 24. The MSC 20 is connected to a data network (not shown) such as the Internet via an inter-working function (IWF) block 50.

FIG. 3 illustrates a signal flow by which an SCH is established between a source BS and a target BS in conventional technology. This procedure is executed to establish an SCH between the source BS and the target BS when a large amount of high rate data is received from an external Packet Data Service Node (PDSN) or data is to be transmitted by assigning the SCH upon call origination from an MS.

Referring to FIG. 3, the source BS 30 recognizes that an MS has origination/termination data to transmit/receive to/from another MS or the PSDN (3a). Then, the source BS 30 determines a traffic burst required during service instance support, selects the target BS 40 which will assist the determined traffic burst, and transmits a burst request message (A7-Burst Request msg.) to the target BS 40, requesting reservation of necessary resources (3b). The target BS 40 checks whether part or all of the requested resources are available and transmits a burst response message (A7-Burst Response msg.) inlcuding information about the resources committed for the traffic burst to the source BS 30 (3c). Meanwhile, the source BS 30 awaits receipt of the burst response message for a first predetermined time. Tbstreq after transmission of the burst request message. Upon receipt of the burst response message within Tbstreq, the source BS 30 prepares a set of frame selectors based on the information of the burst response message and transmits a burst activate message (A7-Burst Activate msg.), which indicates a set of the committed resources to be actually used, to the target BS 40 (3d). If timer Tbstreq expires, the source BS may choose to send an A7-Burst Request message again.

Meanwhile, the target BS 40 awaits receipt of the burst activate message for a second predetermined time Thstcom after transmission of the burst response message. If the target BS 40 receives the burst activate message within Tbstcom, it transmits a connect message (A3-connect msg.), which is for connecting all cell resources to be used for the traffic burst to the designated frame selectors, to the source BS 30 (3e). The source BS 30 transmits a connect acknowledgment message (A3-connect Ack msg.) to the target BS 40, notifying the target BS 40 that physical channels to support the traffic burst are ready (3f). If timer Thstcom expires, the target BS may decommit all radio resources committed for the cell(s) included in this message. Meanwhile, the target BS 40 awaits receipt of the connect acknowledgment message for a third predetermined time Tconn3 after transmission of the connect message. If the target BS 40 receives the connect acknowledgment message within Tconn3, it transmits a burst activate acknowledgment message (A7-Burst Activate Ack. msg.) to the source BS 30 (3g). If timer Tconn3 expires, the BS shall include all new cells that would have been added by the A3-Connect message to the list of non-committed cells in the A7-Burst Response message.

Meanwhile, the source BS 30 awaits receipt of the burst activate acknowledgment message for a fourth predetermined time Tbstact after transmission of the burst activate message in step 3d. If the source BS 30 receives the burst activate acknowledgment message within Tbstact, it transmits a command through a scan message (SCAM_msg.) to an MS, ordering the MS to prepare for the traffic burst (3h). Then, the MS a layer 2 acknowledgment message (Layer 2 Ack. msg.) to the source BS 30 in response to the scan message (3i). The network and the MS exchange forward or reverse traffic burst information for a predetermined time period or until the source BS 30 expands or ends the traffic burst (3j). If timer Tbstact expires, the source BS may choose to resend this message, to terminate traffic burst preparations, or to request that the MSC clear the call association.

The structure of the burst request message transmitted in step 3b is shown in Table 1. The burst request message is an A7 interface message by which a source BS requests reservation of resources to support data traffic burst to a target BS.

TABLE 1

| Information Element | Element Direction | Type | |
|---|---|---|---|
| Message Type II | Source BS > Target BS | M | |
| Call Connection Reference | Source BS > Target BS | O | R |
| Band Class | Source BS > Target BS | O | R |
| Downlink Radio Environment | Source BS > Target BS | O | R |
| CDMA Serving One Way Delay | Source BS > Target BS | O | R |
| Privacy Info | Source BS > Target BS | O | R |
| A3 Signaling Address | Source BS > Target BS | O | R |
| Correlation ID | Source BS > Target BS | O | R |
| SDU ID | Source BS > Target BS | O | R |
| Mobile Identity (IMSI/MIN) | Source BS > Target BS | O | R |
| Mobile Identity (ESN) | Source BS > Target BS | O | R |
| Frame Selector Info | Source BS > Target BS | O | R |
| A7 Cell Info | Source BS > Target BS | O | R |
| Burst Timing | Source BS > Target BS | O | R |

M: Mandatory, O: Optional, R: Recommend, C: Conditionally Recommend

Referring to Table 1, burst request message fields provide information as described below:

1. Call Connection Reference: the only identification used for call connection in the whole system;
2. Band Class: a frequency band;
3. Downlink Radio Environment: a signal strength measurement value provided by a mobile station;
4. CDMA Serving One Way Delay: an estimated value of a single-directional delay in an MS with respect to a cell related with REF_PN;
5. Privacy Info: (public and private) CDMA long code mask information;
6. A3 Signaling Address: network node including an SDU instance in use for a call;
7. Correlation ID: a factor of correlating a request message to a response message;
8. SDU ID: a particular SDU instance ID in one SDU node;
9. Mobile Identity (ESN): Electronic Serial Number (ESN) of an MS;
10. Frame Selector Info: a set of frame selectors used for one call association. This field is used to add a new frame selector to a call association or amend the property of a frame selector in an existing call association;
11. A7 Cell Info: Information about a set of cells to which specific physical cahnnels are added for a call association; and
12. Burst Timing: a factor representative of the period and start time of a data burst on a set of physical channels.

The structure of the burst response message in step 3c is shown below in Table 2. The burst response message is an A7 interface message as a response for the burst request message (A7-Burst Request msg.) by which the source BS requests reservation of resources to support a data traffic burst to the target BS.

TABLE 2

| Information Element | Element Direction | Type | |
|---|---|---|---|
| Message Type II | Source BS > Target BS | M | |
| Call Connection Reference | Source BS > Target BS | O | R |
| Correlation ID | Source BS > Target BS | O | C |
| A7 Committed Cell Info | Source BS > Target BS | O | R |
| A7 Uncommited Cell Info | Source BS > Target BS | O | R |
| Burst Timing | Source BS > Target BS | O | R |

M: Mandatory, O: Optional, R: Recommend, C: Conditionally Recommend

1. Call Connection Reference: an identification for a call connection which is unique to the whole system;
2. Correlation ID: a factor of correlating a request message to a response message;
3. A7 Committed Cell Info: information about a set of cells committed to specific physical channels for a call association by a target BS; and
4. A7 Uncommitted Cell Info: information about a set of cells uncommitted to specific physical channels for a call association by a target BS.

The burst activate message (A7-Burst Activate msg.) in step 3d is shown in Table 3. The burst activate message is an A7 interface message which the source BS transmits to the target BS to commit a set of reserved resources for supporting a data traffic burst.

TABLE 3

| Information Element | Element Direction | Type | |
|---|---|---|---|
| Message Type II | Source BS > Target BS | M | |
| Call Connection Reference | Source BS > Target BS | O | R |
| Correlation ID | Source BS > Target BS | O | C |
| Frame selector Info | Source BS > Target BS | O | R |
| A7 Cell Info | Source BS > Target BS | O | R |

M: Mandatory, O: Optional, R: Recommend, C: Conditionally Recommend

1. Call Connection Reference: an identification for a call connection which is unique to the whole system;
2. Correlation ID: a factor of correlating a request message to a response message;
3. Frame Selector Info: a set of frame selectors used for one call association. This field is used to add a new frame selector to a call association or amend the property of a frame selector in an existing call association; and
4. A7 Cell Info: information about a set of cells to which specific physical channels are added for a call association.

The information elements of the burst activate acknowledgment message (A7-Burst Activate Ack. msg.) in step 3g is shown in Table 4. The burst activate acknowledgment message is an A7 interface response message to the burst activate message which the source BS transmitted to the target BS in order to commit a set of reserved resources for supporting the data traffic burst.

TABLE 4

| Information element | Element Direction | Type | |
|---|---|---|---|
| Message Type II | Target BS > Source BS | M | |
| Call Connection Reference | Target BS > Source BS | O | R |
| Correlation ID | Target BS > Source BS | O | C |
| A7 Uncommited Cell Info | Target BS > Source BS | O | R |

M: Mandatory, O: Optional, R: Recommend, C: Conditionally Recommend

1. Call Connection Reference: an identification for a call connection which is unique to the whole system;
2. Correlation ID: a factor of correlating a request message to a response message; and
3. A7 Uncommitted Cell Info: information about a set of cells uncommitted to specific physical channels for a call association by a target BS.

Table 5 lists the fields of the Frame Selector Info information element included in the burst request message (A7-Burst Request msg.) shown in Table 1 and the burst activate message (A7-Burst Activate msg.) shown in Table 3.

TABLE 5

| 7 | 6 | 5 | 4 | 3 | 2 | 1 | 0 | Octet |
|---|---|---|---|---|---|---|---|---|
| A3/A7 Element Identifier | | | | | | | | 1 |
| Length | | | | | | | | 2 |
| Count of Frame Selectors | | | | | | | | 3 |
| Length of Frame Selector Information | | | | | | | | 4 |
| Reserved | | Frame Selector Index 1 | | | | | | 5 |
| Physical Channel Type 1 | | | | | | | | 6 |
| A3 traffic Channel Protocol Stack 1 | | | | | | | | 7 |
| Frame Offset 1 | | | | | | | | 8 |
| Reserved | | | | (MSB) | | | | 9 |
| ARFCN1 | | | | | | | (LSB) | 10 |
| Forward Channel Bandwidth 1 | | | | | | | | 11 |
| Reverse Channel Bandwidth 1 | | | | | | | | 12 |
| Reserved | | Frame selector Index 2 | | | | | | 13 |
| Physical Channel Type 2 | | | | | | | | 14 |
| A3 Traffic Channel Protocol Stack 2 | | | | | | | | 15 |
| Frame Offset 2 | | | | | | | | 16 |
| Reserved | | | | (MSB) | | | | 17 |
| ARFCN2 | | | | | | | (LSB) | 18 |
| Forward Channel Bandwidth 2 | | | | | | | | 19 |
| Reverse Channel Bandwidth 2 | | | | | | | | 20 |
| . | | | | | | | | . |
| . | | | | | | | | . |
| . | | | | | | | | . |
| Reserved | | Frame Selector Index a | | | | | | m |
| Physical Channel Type a | | | | | | | | m + 1 |
| A3 Traffic Channel Protocol Stack n | | | | | | | | m + 2 |
| Frame Offset n | | | | | | | | m + 3 |
| Reserved | | | | (MSB) | | | | m + 4 |
| ARFCN n | | | | | | | (LSB) | m + 5 |
| Forward Channel Bandwidth n | | | | | | | | m + 6 |
| Reverse Channel Bandwidth n | | | | | | | | m + 7 |

1. Count of Frame Selectors: number of frame selectors;
2. Length of Frame Selector Information: the number of octets used to transmit a set of fields for each instance of a frame selector;
3. Frame Selector Index: a binary value used to uniquely indicate a frame selector used for a call association; and
4. Physical Channel Type: the type of a physical channel associated with a designated frame selector. Table 6 below shows the hex values taken by the Physical Channel Type field.
5. Frame Offset: frame offset for a given frame selector;
6. ARFCN (Actual Radio Frequency Channel Number): real radio frequency channel number related with a band class for a call association;
7. Forward Channel Bandwidth: the band of a forward channel assocaited with a frame selector; and
8. Reverse Channel Bandwidth: the band of a reverse channel assocaited with a frame selector.

TABLE 6

| Value (Hex) | Physical Channel Type |
|---|---|
| 01H | Fundamental Channel (FCH) TIA/EIA/–95 |
| 02H | Supplemental Channel (SCH) TIA/EIA/–95 |
| 03H | Dedicated Control Channel (DCCH) TIA/EIA/–95 |
| 8OH to 9FH | Reserved for UMTS |
| All other values | Reserved |

As shown in Table 6, since the Physical Channel Type field only defines IS-95 channels, and not CDMA-2000 channels, when the CDMA-2000 standard is applied to a mobile communication system, the Base Stations will not be able to identify channels because the CDMA-2000 channels will be confused with IS-95 channels.

The A3 Traffic Channel Protocol Stack is a protocol stack used for an A3 traffic channel attached to a given frame selector. Its structure is shown below, in Table 7.

TABLE 7

| Value (Hex) | Protocol Stack |
|---|---|
| 01H | AAL2/ATM/Physical Layer |
| All other values | Reserved |

As noted from Table 7, only the AAL2 (ATM Adaptation Layer 2) protocol, which is used for voice service, is defined in the protocol stack used for the A3 traffic channel. Therefore, the protocol stack is not fit for high rate data.

Burst Timing included in the burst request message (A7-Burst Request msg.) shown in Table 1 and the burst response message (A7-Burst Response msg.) shown in Table 2 have the following information elements, shown below in Table 8.

TABLE 8

| 7 | 6 | 5 | 4 | 3 | 2 | 1 | 0 | Octet |
|---|---|---|---|---|---|---|---|---|
| A3/A7 Element Identifier | | | | | | | | 1 |
| Length | | | | | | | | 2 |
| Burst Action Time | | | | | | | | 3 |
| (MSB) | | | Burst Duraction | | | | | 4 |
| | | | | | | | (LSB) | 5 |

1. Burst Action Time: accurate start time of a data burst; and
2. Burst Duration: a binary value indicating burst duration expressed in the number of frames. The binary value is the assignment time of an IS-95 SCH and an IS-95B SCCH in IS-2000.

The above-described conventional technology has the following problems within a BS and between BSs, not with a radio link between a BS and an MS.

There is no way to discriminate between the FCH and SCH in the IS-95B standard and the FCH, DCCH, and SCH in the CDMA-2000 standard with the Frame Selector Info fields shown in Table 5 in the procedure shown in FIG. 3. Therefore, a BS cannot adequately identify channels. Furthermore, high rate data cannot be transmitted since only the AAL2 protocol, which is used for voice service, is defined in the A3 Traffic Channel Protocol Stack.

The duration and start time of a data burst cannot be supported on a concurrent bi-directional SCH or SCCH with the burst timing message of Table 8. The DTX duration of a reverse SCH and SCCH is not provided, thereby making it impossible to perform rapid packet service in a BS. Consequently, a new method should be explored to process high rate data.

SUMMARY OF THE INVENTION

It is, therefore, an object of the present invention to provide a method of enabling a BTS to identify channels by defining an identification (ID) which discriminates between the fundamental and supplemental channels (FCH and SCH) of the IS-95B standard and the fundamental, dedicated control, and supplemental channels (FCH, DCCH, and SCH) of the CDMA-2000 standard in a message transmitted to or received from a BS.

It is another object of the present invention to provide the AAL5 (ATM Adaptation Layer 5) protocol, which is used to effectively transmit high rate data, in an A3 traffic channel protocol stack field.

It is a further object of the present invention to provide a burst timing message which is defined to support the duration and start time of a data burst on a concurrent bi-directional SCH or SCCH as well as to provide the DTX duration of a reverse SCH and SCCH.

It is still another object of the present invention to provide a method of defining forward and reverse burst timing messages in one message or defining them separately to be available in either direction as well as both directions, and expressing the start time of a burst in various units, to thereby implement a burst operation at a more accurate time.

These and other objects are achieved by providing a method of establishing an SCH which allows for burst timing for high-speed data transmission in a mobile communication system. In the SCH establishing method, a source base station transceiver determines a traffic burst and sends a target base station transceiver a burst request message including forward and reverse burst timing information and having channel use time, which is determined in consideration of a discontinuous transmission (DTX) mode in order to reserve necessary resources, when a large amount of high rate data is to be transmitted. Then, the target base station transceiver sends the source base station transceiver a burst response message including information about resources committed to the traffic burst.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
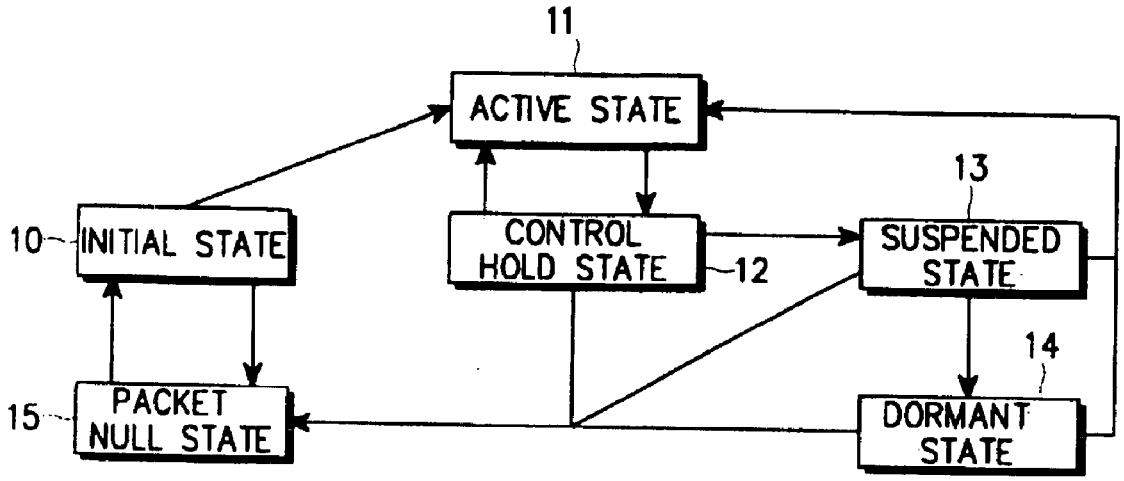
FIG. 1 PRIOR ART
FIG. 1 is a state transition diagram for typical packet service in a mobile communication system.
Figure 2:
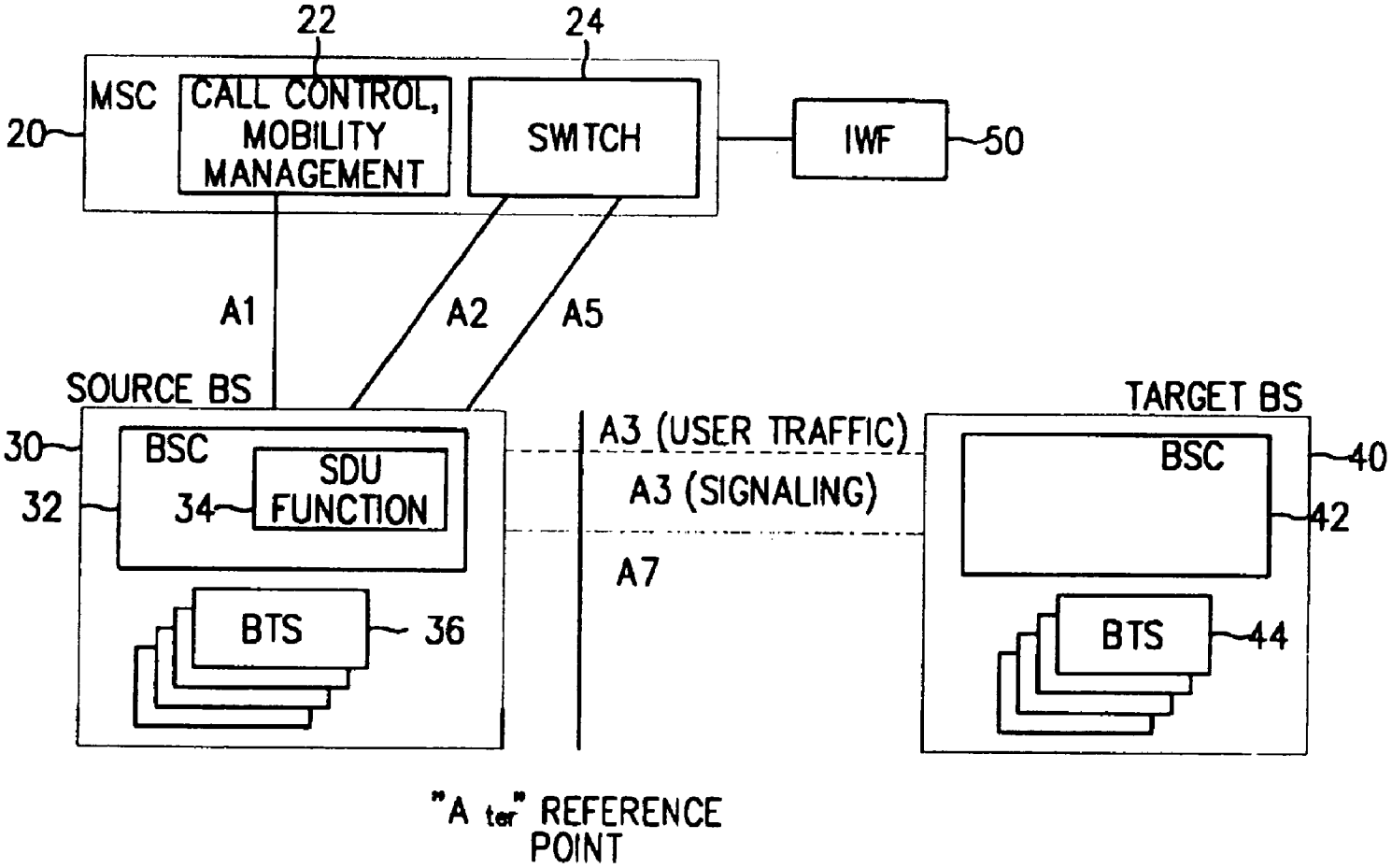
FIG. 2 PRIOR ART
FIG. 2 illustrates a reference model of 3G IOS for a digital air interface between an MSC and a BS and between BSs in a typical mobile communication system.
Figure 3:
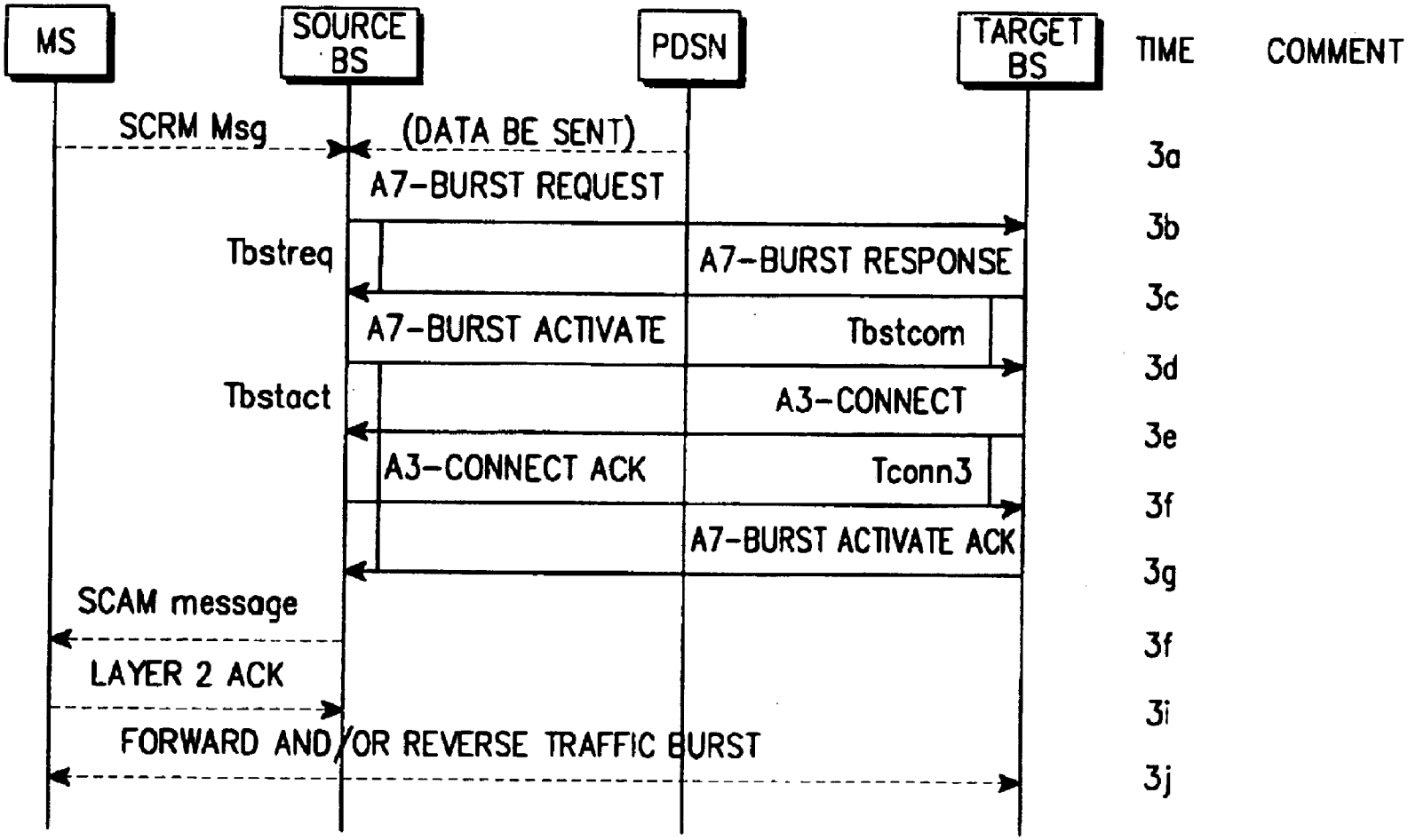
FIG. 3 PRIOR ART
FIG. 3 is a signal flow in a procedure of establishing an SCH between a source BS and a target BS according to conventional technology.

A preferred embodiment of the present invention will be described hereinbelow with reference to the accompanying drawings. In the following description, well-known functions or constructions are not described in detail since they would obscure the invention in unnecessary detail.

In the preferred embodiment of the present invention, in order to facilitate channel identification in a BTS, an ID field is formed to discriminate between an FCH and an SCH in the IS-95B standard and an FCH, a DCCH, and an SCH in the IS-2000 standard in a field of the Frame Selector Info information element defined in a signal message transmitted or received within a BS. A message containing the frame selector information can be the burst request message of Table 1 or the burst activate message of Table 3, both of which were mentioned earlier in the description of the prior art.

Table 9 illustrates a modified Physical Channel Type field in the Frame Selector Info information element according to the preferred embodiment of the present invention.

TABLE 9

| Value (Hex) | Physical Channel Type |
|---|---|
| 01H | Fundamental Channel (FCH) TIA/EIA-95 |
| 02H | Supplemental Code Channel (SCCH) TIA/EIA-95B |
| 03H | Fundamental channel (FCH) CDMA-2000 |
| 04H | Dedicated Control Channel (DCCH) CDMA-2000 |
| 05H | Supplemental Channel CDMA-2000 |
| 8OH to 9FH | Reserved for UMTS |
| All other values | Reserved |

In Table 9, the IS-95 FCH and the IS-95B SCH are defined as 01H and 02H, respectively. The FCH, DCCH, and SCH of CDMA-2000 are defined as 03H, 04H, and 05H. Thus, the FCH and SCH of IS-95B can be distinguished from the FCH, DCCH, and SCH of IS-2000.

The A3 Traffic Channel Protocol Stack field of Table 5 is modified as shown below in order to support the AAL5 protocol, which is appropriate for transmission of high rate data, in an A3 traffic channel protocol.

TABLE 10

| Value (Hex) | Protocol Stack |
|---|---|
| 01H | AAL2/ATM/Physical Layer |
| 02H | AAL5/ATM/Physical Layer |
| All other values | Reserved |

In accordance with the preferred embodiment of the present invention, the definition of the message fields as shown in Tables 9 and 10 allows a BTS both to distinguish the FCH and SCH of IS-95B from the FCH, DCCH, and SCH of CDMA-2000 and to transmit high rate data.

The preferred embodiment of the present invention defines a new burst timing message. The burst timing message as shown in Table 11 can support the duration and start time of data burst concurrently on bi-directional FCHs or SCHs and provide the burst DTX duration of a reverse SCH and SCCH.

TABLE 11

| 7 | 6 | 5 | 4 | 3 | 2 | 1 | 0 | Octet |
|---|---|---|---|---|---|---|---|---|
| A3/A7 Element Identifier | | | | | | | | 1 |
| Length | | | | | | | | 2 |
| Forward Burst Action (or Start) Time | | | | | | | | 3 |
| Reverse Burst Action (or Start) Time | | | | | | | | 4 |
| Reserved | | For_Infinite_Burst_Duration | | Rev_Burst_DTX_Duration | | Rev_Infinite_Burst_Duration | | 5 |
| For_Burst_Duration | | | | | | | | 6 |
| Rev_Burst_Duration | | | | | | | | 7 |
| Reserved | | Begin Preamble | | | | Resume Preamble | | 8 |

1. Length: the number of octets for information elements following this field;
2. Forward Burst Action (or Start) Time: system time when a forward SCH or SCCH is assigned;
3. Reverse Burst Action (or Start) Time: system time when a reverse SCH or SCCH is assigned;
4. For_Infinite_Burst_Duration: a field indicating whether a forward SCH and SCCH are assigned for an infinite period or not. If a BTS sets this field to 1, the forward SCH or SCCH is assigned for a predetermined time expressed in the number of 80-ms frames after the forward burst action time, and, if the BTS sets the field to 0,it is assigned for an infinite period;
5. Rev_Burst_DTX_Duration: the maximum number of 20-ms frames for which an MS stops transmission of a reverse SCH or SCCH before resuming transmission for a period assigned on the reverse SCH or SCCH. This field is set by a BTS;
6. Rev_Infinite_Burst_Duration: a field indicating whether a reverse SCH and SCCH are assigned for an infinite period or not. If a BTS sets this field to 1, the reverse SCH or SCCH is assigned for a predetermined time expressed in the number of 80-ms frames after the reverse burst action time, and, if the BTS sets the field to 0, it is assigned for an infinite period;
7. For_Burst_Duration: a time period expressed in 80ms units, for which a forward SCH or SCCH is assigned;
8. Rev_Burst_Duration: a time period expressed in 80ms units, for which a reverse SCH or SCCH is assigned;
9. Begin Preamble: the number of preamble frames transmittable from an MS on a reverse SCH or SCCH at the start of transmission of the reverse SCH or SCCH; and
10. Resume Preamble: the number of preamble frames transmittable from an MS on a reverse SCH or SCCH at the start of re-transmission of the reverse SCH or SCCH.

The forward and reverse burst timing messages shown in Table 11 can be defined in one message or in separate messages.

Table 12 shows a forward burst timing message which provides the duration, start time, and start time unit of a forward data burst.

TABLE 12

| 7 | 6 | 5 | 4 | 3 | 2 | 1 | 0 | Octet |
|---|---|---|---|---|---|---|---|---|
| A3/A7 Element Identifier | | | | | | | | 1 |
| Length | | | | | | | | 2 |
| Reserved | | | Action (or Start) Time Unit | | | | For_Infinite_Burst_Duration | 3 |
| For_Burst_Duration | | | | | | | | 4 |
| Forward Burst Action (or Start) Time | | | | | | | | 5 |

1. Length: the number of octets for information elements following this field;
2. Action (or Start) Time Unit: the action time unit of a forward burst. A BTS sets this field to a number 1 smaller than the number of 20-ms frames;
3. For_Infinite_Burst_Duration: a field indicating whether a forward SCH and SCCH are assigned for an infinite period or not. If a BTS sets this field to 1, the forward SCH or SCCH is assigned for a predetermined time expressed in the number of 80-ms frames after the forward burst action time, and, if the BTS sets the field to 0, it is assigned for an infinite period;
4. For_Burst_Duration: a time period expressed in 80ms units, for which a forward SCH or SCCH is assigned; and 5. Forward Burst Action (or Start) Time: system time when a forward SCH or SCCH is assigned.

Table 13 shows a reverse burst timing message which provides the duration, start time, and start time unit of a data burst on a reverse SCH or SCCH.

TABLE 13

| 7 | 6 | 5 | 4 | 3 | 2 | 1 | 0 | Octet |
|---|---|---|---|---|---|---|---|---|
| A3/A7 Element Identifier | | | | | | | | 1 |
| Length | | | | | | | | 2 |
| Action (or Start) Time Unit | | | Rev_Burst_DTX_ Duration | | | | Rev_Infinite _Burst_ Duration | 3 |
| Rev_Burst_Duration | | | | | | | | 4 |
| Reverse Burst Action (or Start) Time | | | | | | | | 5 |
| Reserved | | Begin Preamble | | | | Resume Preamble | | 6 |

1. Length: the number of octets for information elements following this field;
2. Action (or Start) Time Unit: the action time unit of a reverse burst. A BTS sets this field to a number 1 smaller than the number of 20-ms frames;
3. Rev_Burst_DTX_Duration: the maximum number of 20-ms frames for which an MS stops transmission on a reverse SCH or SCCH before resuming transmission for a period assigned on the reverse SCH or SCCH. This field is set by a BTS;
4. Rev_Infinite_Burst_Duration: a field indicating whether a reverse SCH and SCCH are assigned for an infinite period or not. If a BTS sets this field to 1, the reverse SCH or SCCH is assigned for a predetermined time expressed in the number of 80-ms frames after the reverse burst action time, and, if the BTS sets the field to 0, it is assigned for an infinite period;
5. Rev_Burst_Duration: a time period expressed in 80ms units, for which a reverse SCH or SCCH is assigned;
6. Reverse Burst Action (or Start) Time: system time when a reverse SCH or SCCH is assigned;
7. Begin Preamble: the number of preamble frames transmittable from an MS on a reverse SCH or SCCH at the start of transmission of the reverse SCH or SCCH; and
8. Resume Preamble: the number of preamble frames transmittable from an MS on a reverse SCH or SCCH at the start of re-transmission of the reverse SCH or SCCH.

Figure 4:
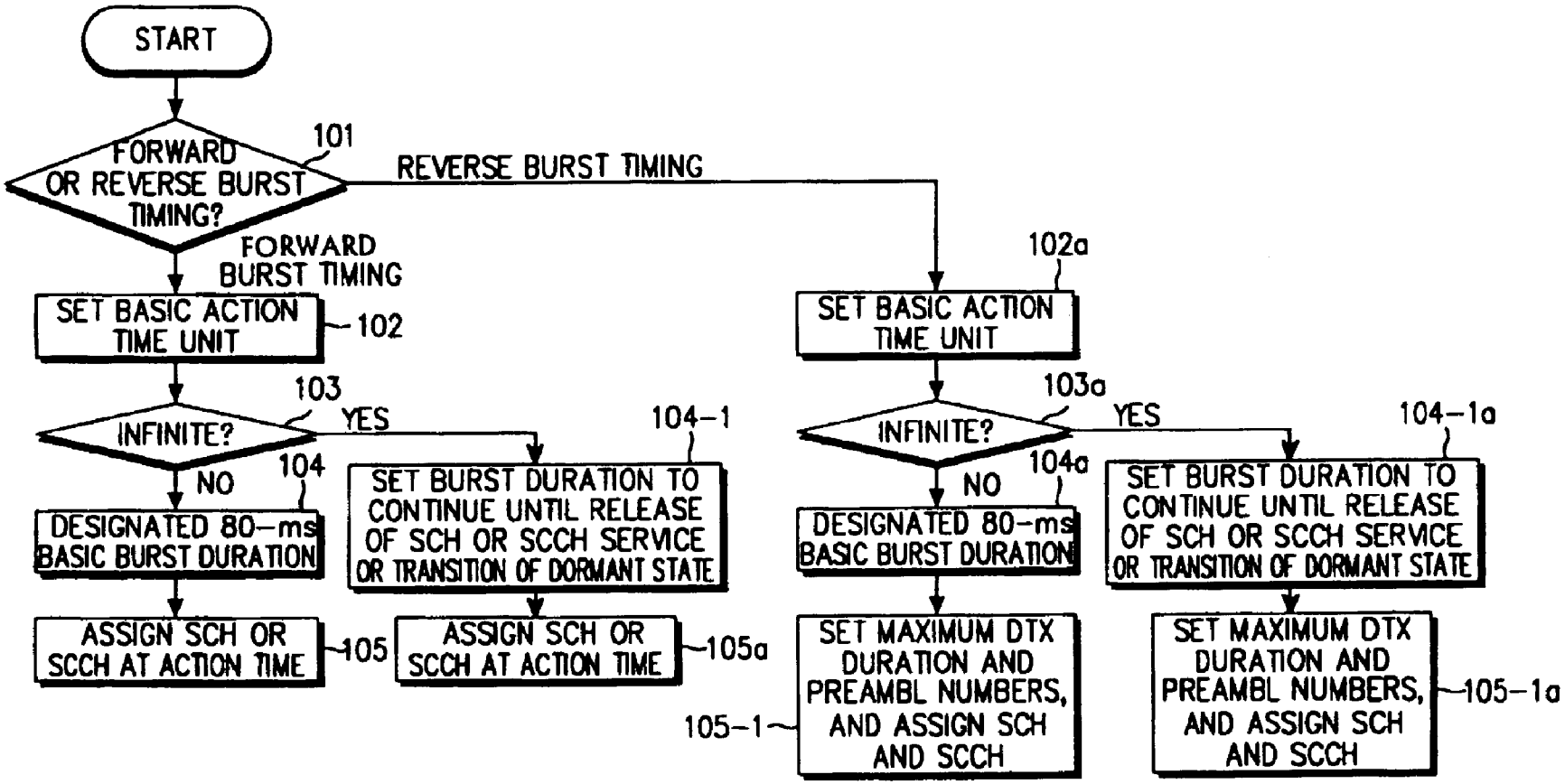
FIG. 4 is a flowchart illustrating a procedure of receiving a burst timing message according to an embodiment of the present invention.

FIG. 4 is a flowchart illustrating an operation of receiving a burst timing message according to the preferred embodiment of the present invention. The procedure will be described in the context of separately defined forward and reverse burst timing messages shown in Tables 12 and 13.

Referring to FIG. 4, a BTS determines whether a burst timing message received from a BSC is forward link or reverse link information in step 101. If it is forward link information, the BTS reads the Action Time Unit field from the burst timing message and determines an action time unit for a time point when an SCH or SCCH is to be assigned in step 102.

The BTS determines whether the burst duration to be assigned is set to infinite in the burst timing message in step 103. If the burst duration is not set to infinite, the BTS sets a burst duration to a value in the message on an 80-ms basis in step 104, and then initiates assignment of a forward SCH or SCCH at an action (or start) time set in the message in step 105.

Meanwhile, if the burst duration is set to infinite in step 103, the BTS sets the burst duration to be maintained until an SCH or SCCH service released or a dormant state is entered in step 104-1. Here, the service covers all services provided on an SCH or SCCH, including packet, circuit, and ISDN services. After the burst duration is set, the BTS initiates assignment of the forward SCH or SCCH at the action (or start) time set in the message in step 105a.

If the burst timing message received from the BSC is reverse link information in step 101, the BTS reads the Action Time Unit field from the burst timing message and determines an action time unit for a time point when an SCH or SCCH is to be assigned in step 102a.

The BTS determines whether the burst duration to be assigned is set to infinite in the burst timing message in step 103a. If the burst duration is not set to infinite, the BTS sets the burst duration to a value in the message on an 80-ms basis in step 104a. In step 105-1, the BTS reads the maximum reverse DTX_Duration field and sets maximum DTX_Duration on a 10-ms basis for the reverse SCH or SCCH receiver. In addition, the BTS sets the Begin Preamble and Resume Preamble when the SCH or SCCH is assigned. Finally, the BTS initiates assignment of the reverse SCH or SCCH at the action (or start) time set in the message.

If the burst duration is set to infinite in step 103a, the BTS sets the burst duration to be maintained until an SCH or SCCH service is released or a dormant state is entered in step 104-1a. Here, the service covers all services provided on an SCH or SCCH, including packet, circuit, and ISDN services. In step 105-1a, the BTS reads the maximum reverse DTX_Duration field and sets maximum DTX_Duration on a 10-ms basis for the reverse SCH or SCCH receiver. On addition, the BTS sets the Begin Preamble and Resume Preamble when the SCH or SCCH is assigned. Finally, the BTS initiates assignment of the reverse SCH or SCCH at the action (or start) time set in the message.

In accordance with the preferred embodiment of the present invention as described above, when a BTS transmits a high rate data burst on a physical channel, 1) the AAL5 protocol can be supported in an A3 traffic channel protocol, 2) the FCH and SCH of the IS-95B standard can be distinguished from the FCH, DCCH, and SCH of the CDMA-2000 standard, and 3) high rate data can be effectively transmitted through an A3 interface. Another advantage of the present invention is that the duration, start time, and start time unit of forward and reverse data burst on an SCH or SCCH is provided through a newly defined burst timing message to thereby designate a more accurate burst action time. Furthermore, a reverse DTX duration is provided so as to support bi-directional high rate packet data.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of establishing a supplemental channel (SCH) in a mobile communication system, comprising the steps of:

determining that a traffic burst exists;

sending a target base station transceiver a burst message in order to reserve necessary resources when a large amount of high rate data is to be transmitted, said burst request message being sent by a source base station transceiver, said burst request message further including burst timing information to support a duration and start time of the traffic burst; and sending the source base station transceiver a burst response message including information about resources committed to the traffic burst by the target base station transceiver.

2. The method of claim 1, wherein the burst request message includes an information field in which a physical channel type is designated, said physical channel type being designated in such a way that an IS-95 standard physical channel is distinguished from a CDMA-2000 physical channel.

3. The method of claim 2, wherein the physical channel type designations include a fundamental channel (FCH) and a supplemental channel (SCH) of the IS-95 standard, as well as a fundamental channel (FCH), a dedicated control channel (DCCH), and a supplemental channel (SCH) of the CDMA-2000 standard.

4. The method of claim 1, wherein the burst timing information includes:

a system time at which a forward physical channel is assigned;

a system time at which a reverse physical channel is assigned;

a field indicating whether a forward SCH is assigned for an infinite period or not;

a field indicating whether a reverse SCH is assigned for an infinite period or not;

a duration of the forward physical channel; and a duration of the reverse physical channel.

5. The method of claim 4, wherein the reverse burst timing information additionally includes:

a begin preamble at which the number of preamble frames on a reverse SCH at the start of transmission;

a resume preamble, at which the number of preamble frames on a reverse SCH at the start of retransmission; and a reverse burst DTX duration at which a mobile station stops transmission of a reverse SCH before resuming transmission for a period assigned on the reverse SCH.

6. The method of claim 4, wherein the physical channel is an SCH or a supplemental code channel (SCCH).

7. The method of claim 1, wherein the forward burst timing information includes a forward burst timing information and a reverse burst timing information.

8. The method of claim 1, wherein the burst request message includes information about an A3 interface traffic channel protocol specification, said A3 interface traffic channel protocol specification having a protocol for high-speed data transmission.

9. The method of claim 8, wherein the A3 traffic channel protocol specification includes an AAL2 (ATM Adaptation Layer 2) protocol for voice service and an AAL5 (ATM Adaptation Layer 5) protocol for transmission of high rate data.

10. A method for assigning a channel when a base station controller receives a burst timing message from a base station transceiver in a mobile communication system, comprising the steps of:

receiving a burst timing message;

reading an action time unit from the burst timing message, if the burst timing message includes forward burst timing information;

setting an action time unit in which a physical channel is set up;

determining from the burst timing message whether the physical channel is to be assigned for a definite duration or for an indefinite duration;

setting a burst duration to a value set in the burst timing message if it is determined that the assignment is for a definite duration;

setting a burst duration to be maintained until the physical channel is released or a mobile station state transitions to a dormant state, if it is determined that the assignment is for an indefinite duration; and assigning a prepared forward physical channel at an action start time set by the message.

11. A method for assigning a channel when a base station transceiver receives a burst timing message from a base station controller in a mobile communication system, comprising the steps of:

receiving a burst timing message;

reading an action time unit from the burst timing message, if the burst timing message includes reverse burst timing information;

setting an action time unit in which a physical channel is set up;

determining from the burst timing message whether the physical channel it to be assigned for a definite duration or for an indefinite duration;

setting a burst duration to a value set in the burst timing message if it is determined that the assignment is for a definite duration;

setting a burst duration to be maintained until the physical channel is released or a mobile station state transitions to a dormant state, if it is determined that the assignment is for an indefinite duration; and reading a reverse discontinuous transmission (DTX) duration field in the burst timing message, said reverse DTX duration field being set for the mobile station;

setting a maximum DTX duration of a reverse physical channel;

setting a number of preamble frames to be received when the reverse physical channel is assigned;

setting a number of preamble frames to be received after a DTX period, said number of preamble frames based on information in the burst timing message; and assigning a prepared reverse physical channel at an action start time set by the message.

*12. A method of establishing a supplemental channel (SCH) in a mobile communication system, comprising the steps of:*

*determining that a traffic burst exists;*

*sending toward a target base station a burst request message in order to reserve necessary resources for the traffic burst, said burst request message being sent from the direction of a source base station, and including burst timing information to indicate a duration and start time of the traffic burst; and*

*sending toward the source base station a burst response message including information about necessary resources committed to the traffic burst, the burst response message being sent from the by the target base station;*

*wherein the burst timing information includes a forward burst timing information and a reverse burst timing information.*

*13. The method of claim 12, wherein the burst request message includes an information field that is used to designate a physical channel type, said physical channel type being designated in such a way that an IS-95 standard physical channel is distinguished from a CDMA-2000 physical channel.*

*14. The method of claim 13, wherein the physical channel type designations designate at least one of a fundamental channel (FCH), and a supplemental channel (SCH) of the*

*IS-95 standard, as well as a fundamental channel (FCH), a dedicated control channel (DCCH), and a supplemental channel (SCH) of the CDMA-2000 standard.*

*15. The method of claim 12, wherein the burst timing information includes:*

*a system time at which a forward physical channel is assigned;*

*a system time at which a reverse physical channel is assigned;*

*a duration of the forward physical channel; and*

*a duration of the reverse physical channel.*

*16. The method of claim 15, wherein the burst timing information additionally includes:*

*a begin preamble which is the number of preamble frames on a reverse SCH at the start of transmission;*

*a resume preamble which is the number of preamble frames on a reverse SCH at the start of retransmission; and*

*a reverse burst DTX duration at which a mobile station stops transmission of a reverse SCH before resuming transmission for a period assigned on the reverse SCH.*

*17. The method of claim 15, wherein the physical channel is one of an SCH and a supplemental code channel (SCCH).*

*18. The method of claim 12, wherein the burst request message includes information about an A3 interface traffic channel protocol specification, said A3 interface traffic channel protocol specification having a protocol for high-speed data transmission.*

*19. The method of claim 19, wherein the A3 interface traffic channel protocol specification includes an AAL2 (ATM Adaption Layer 2) protocol for voice service and an AAL5 (ATM Adaptation Layer 5) protocol for transmission of high rate data.*

*20. A method for assigning a channel when a burst timing message is sent from a direction of a source base station toward a target base station in a mobile communication system, comprising the steps of:*

*receiving a burst timing message;*

*reading an action time unit field from the burst timing message, if the burst timing message includes forward burst timing information;*

*setting an action time unit for a point of time at which a physical channel is set up;*

*determining from the burst timing message whether the physical channel is to be assigned for a definite duration or for an indefinite duration;*

*setting a burst duration to a value set in the burst timing message if it is determined that the assignment is for a definite duration;*

*setting a burst duration to be maintained until the physical channel is released or a mobile station state transitions to a dormant state, if it is determined that the assignment is for an indefinite duration; and*

*assigning a prepared forward physical channel at an action start time set by the message.*

*21. The method of claim 20, further comprising the steps of:*

*reading a reverse discontinuous transmission (DTX) duration field in the burst timing message, said reverse DTX duration field being set for the mobile station;*

*setting a maximum DTX duration of a reverse physical channel;*

*setting a number of preamble frames to be received when the reverse physical channel is assigned; and*

*setting a number of preamble frames to be received after a DTX period, said number of preamble frames based on information in the burst timing message.*

*22. A system for establishing a supplemental channel (SCH) in a mobile communication system, comprising:*

*a source base station configured to send a burst request message to a target base station for reserving necessary resources for a traffic burst, when the traffic burst exists, said burst request message including burst timing information indicating a duration and start time of the traffic burst; and*

*a target base station configured to receive the burst request message, and send a burst response message to the source base station, the burst response message including information about communication resources committed to the traffic burst;*

*wherein the burst timing information includes a forward burst timing information and a reverse burst timing information.*

*23. The system of claim 22, wherein the burst request message includes an information field that is used to designate a physical channel type, said physical channel type being designated in such a way that an IS-95 standard physical channel is distinguished from a CDMA-2000 physical channel.*

*24. The method of claim 23, wherein the physical channel type designations designate at least one of a fundamental channel (FCH), and a supplemental channel (SCH) of the IS-95 standard, as well as a fundamental channel (FCH), a dedicated control channel (DCCH), and a supplemental channel (SCH) of the CDMA-2000 standard.*

*25. The method of claim 22, wherein the burst timing information includes:*

*a system time at which a forward physical channel is assigned;*

*a system time at which a reverse physical channel is assigned;*

*a duration of the forward physical channel; and*

*a duration of the reverse physical channel.*

*26. The method of claim 25, wherein the burst timing information additionally includes:*

*a begin preamble which is the number of preamble frames on a reverse SCH at the start of transmission;*

*a resume preamble which is the number of preamble frames on a reverse SCH at the start of retransmission; and*

*a reverse burst DTX duration at which a mobile station stops transmission of a reverse SCH before resuming transmission for a period assigned on the reverse SCH.*

*27. The method of claim 25, wherein the physical channel is one of an SCH and a supplemental code channel (SCCH).*

*28. A method of establishing a supplemental channel (SCH) in a mobile communication system, comprising the steps of:*

*determining that a traffic burst exists;*

*sending a target base station a burst request message in order to reserve necessary resources when a large amount of high rate data is to be transmitted, said burst request message being sent by a source base station, said burst request message further including burst timing information to support a duration and start time of the traffic burst; and*

*sending the source base station a burst response message including information about resources committed to the traffic burst by the target base station;*

*wherein the burst timing information includes a forward burst timing information and a reverse burst timing information.*

* * * * *